Patented Aug. 3, 1926.

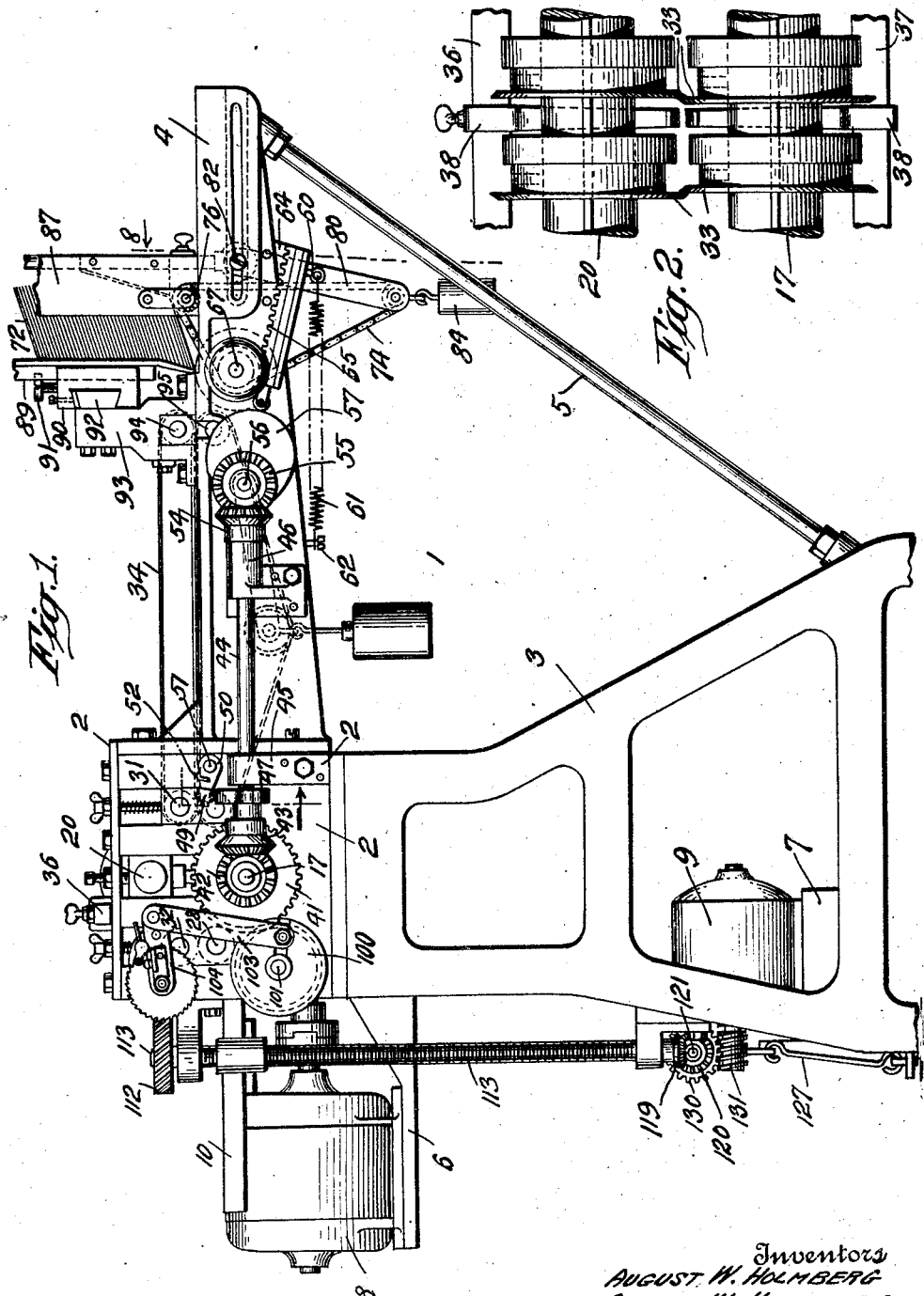

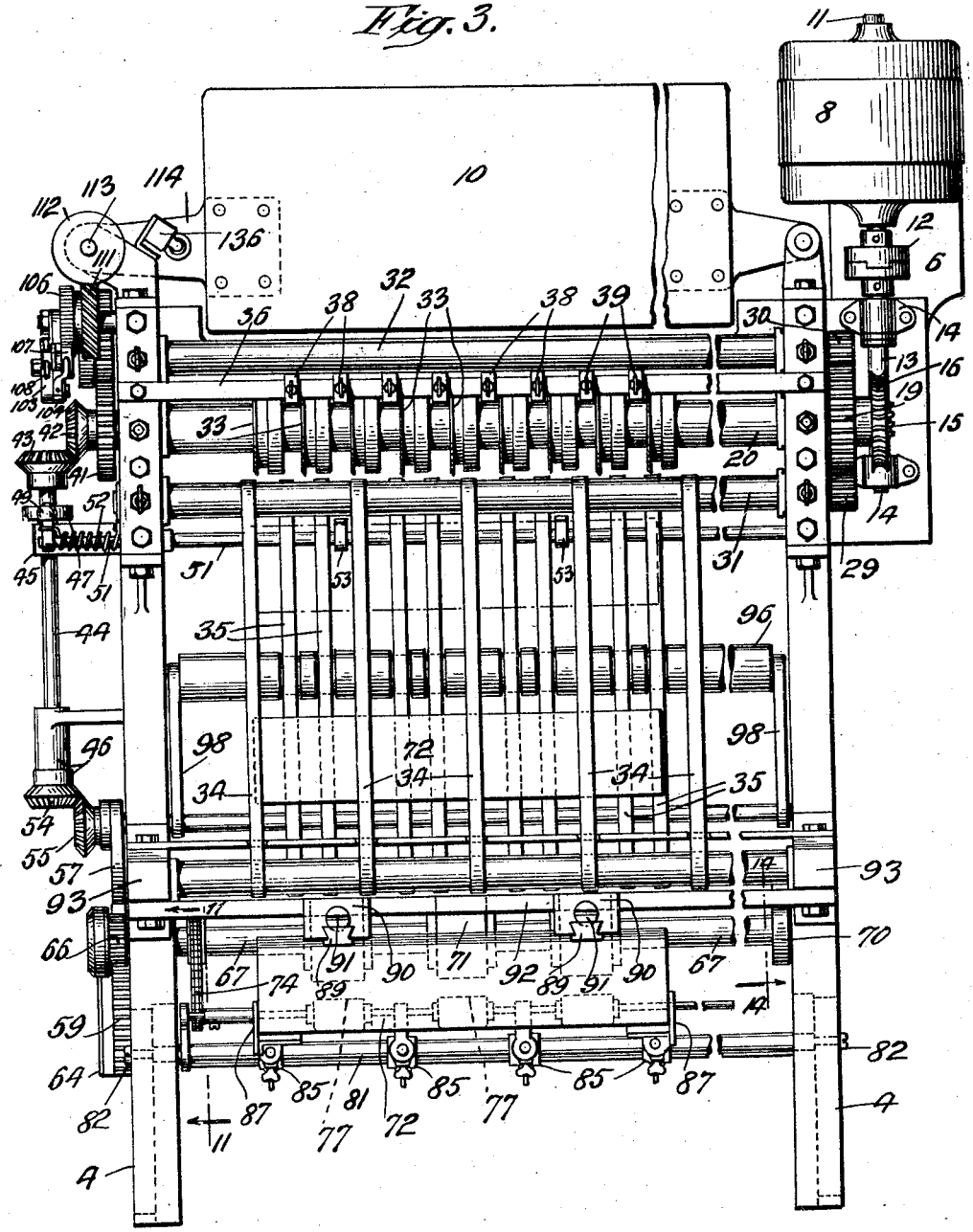

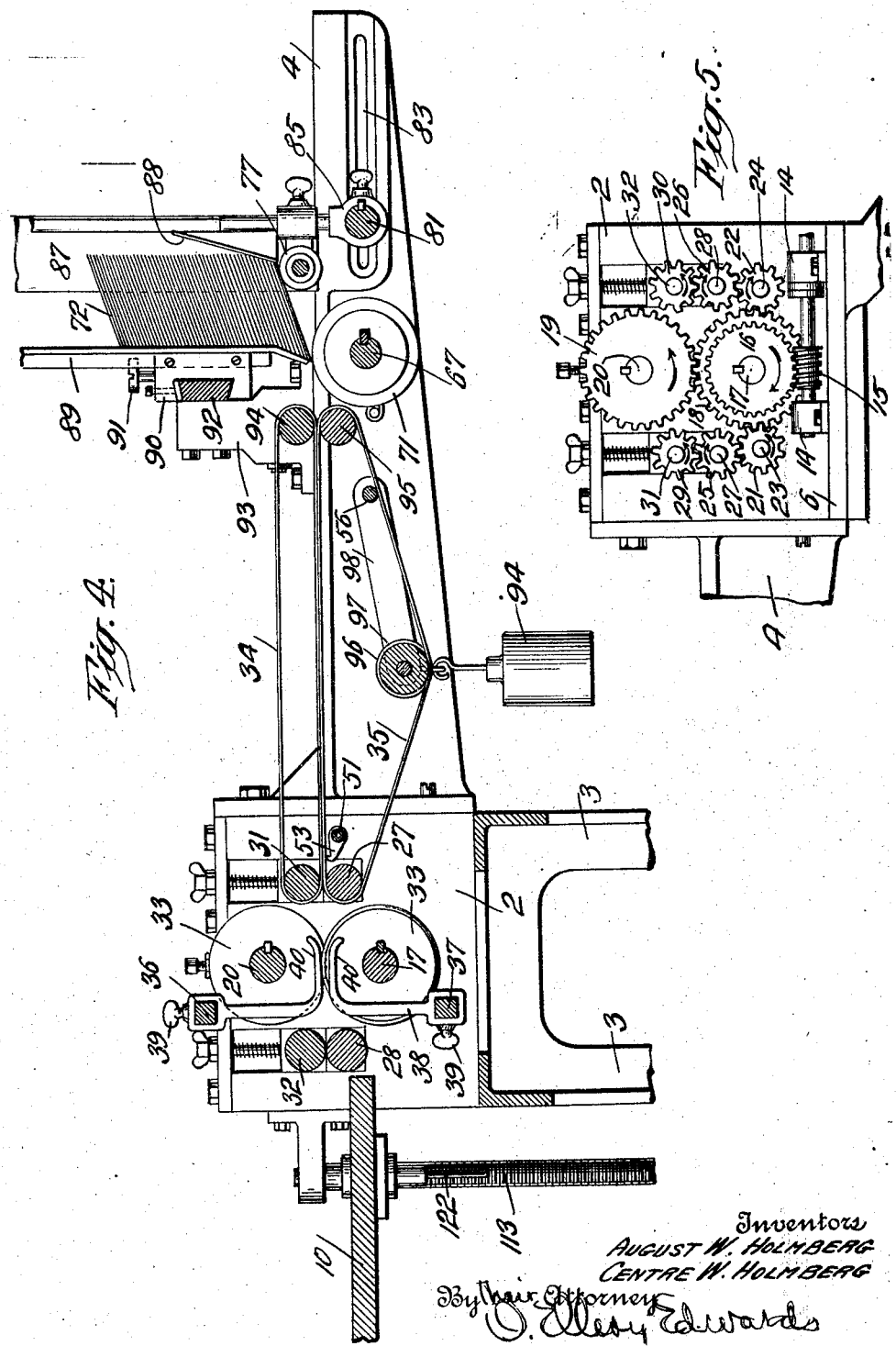

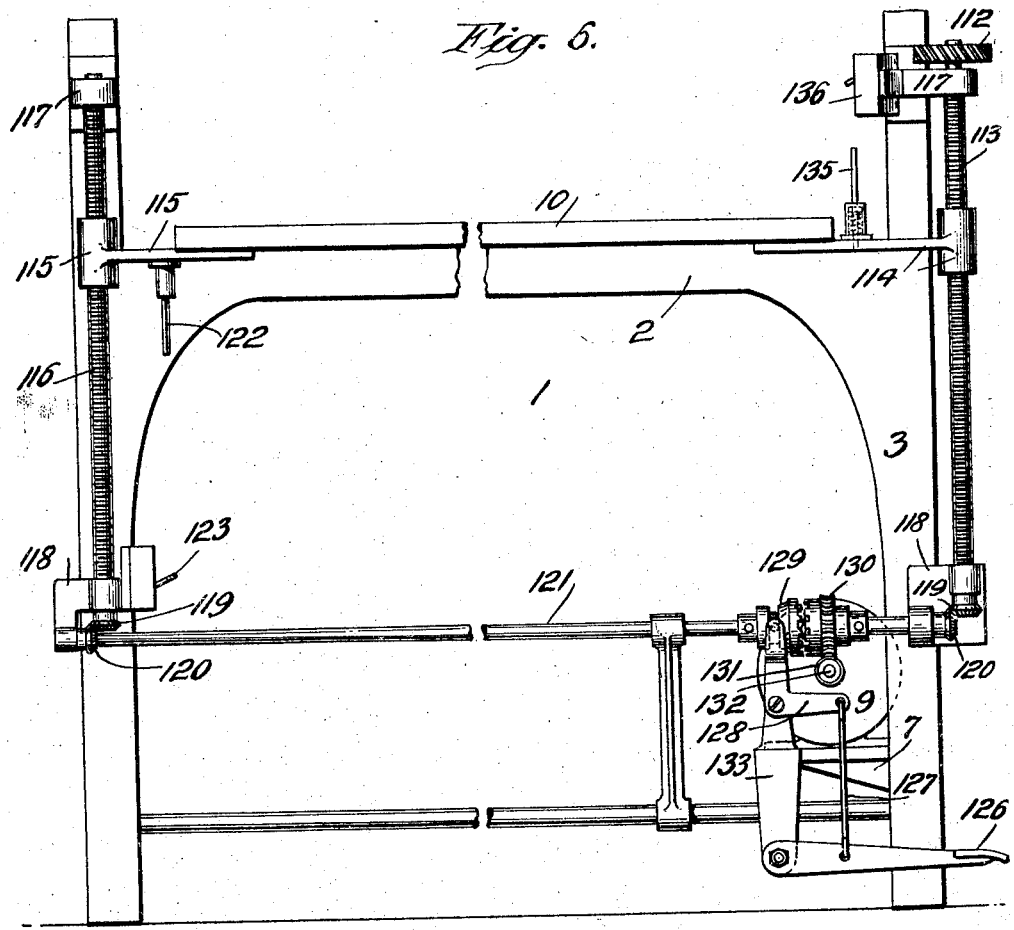
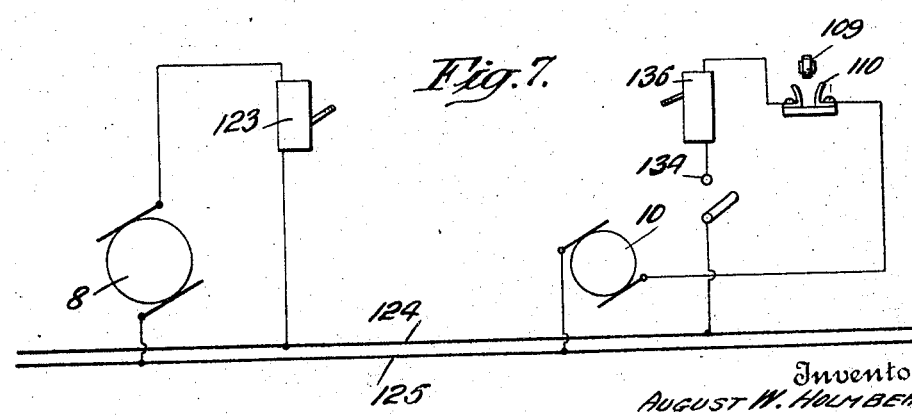

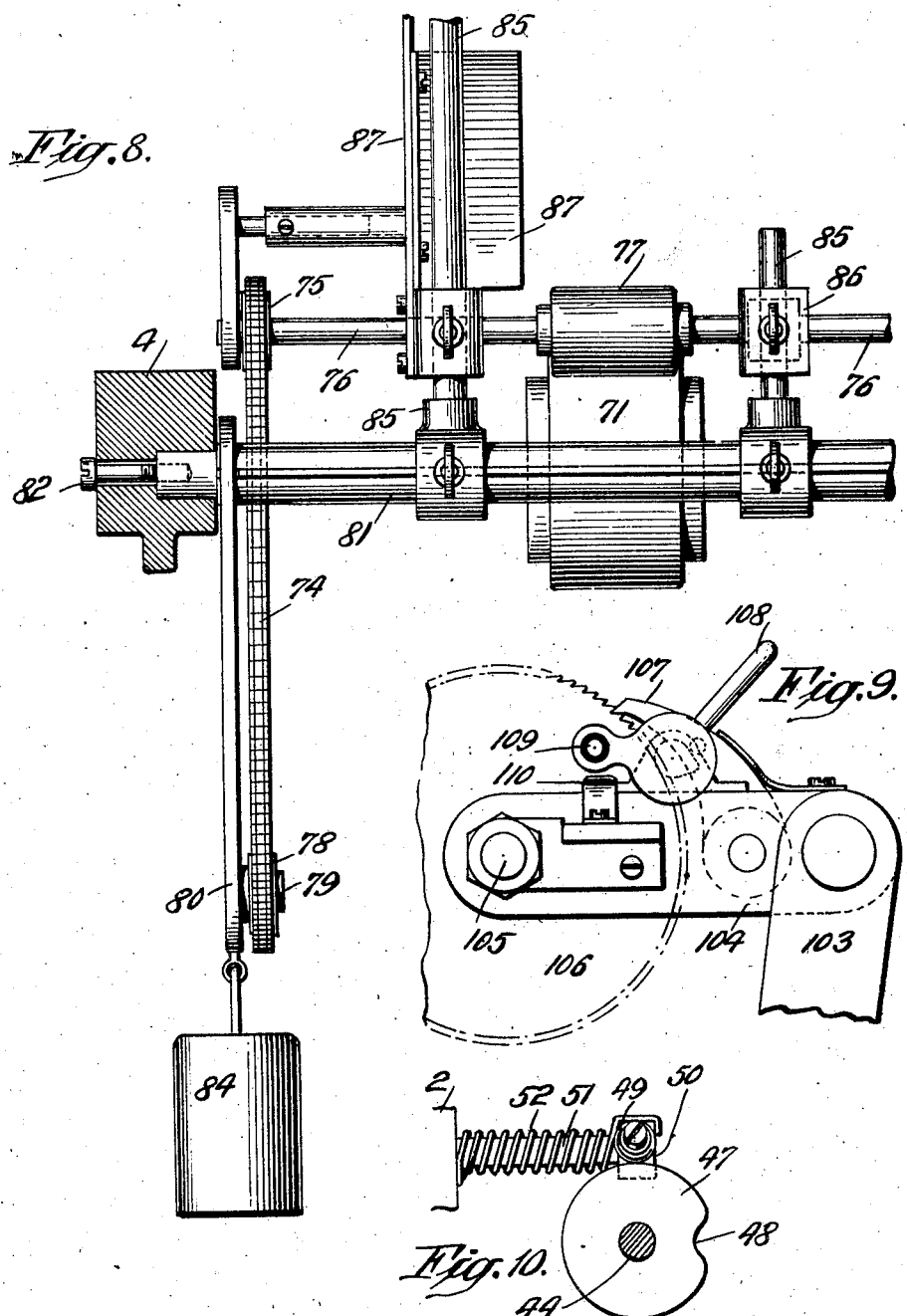

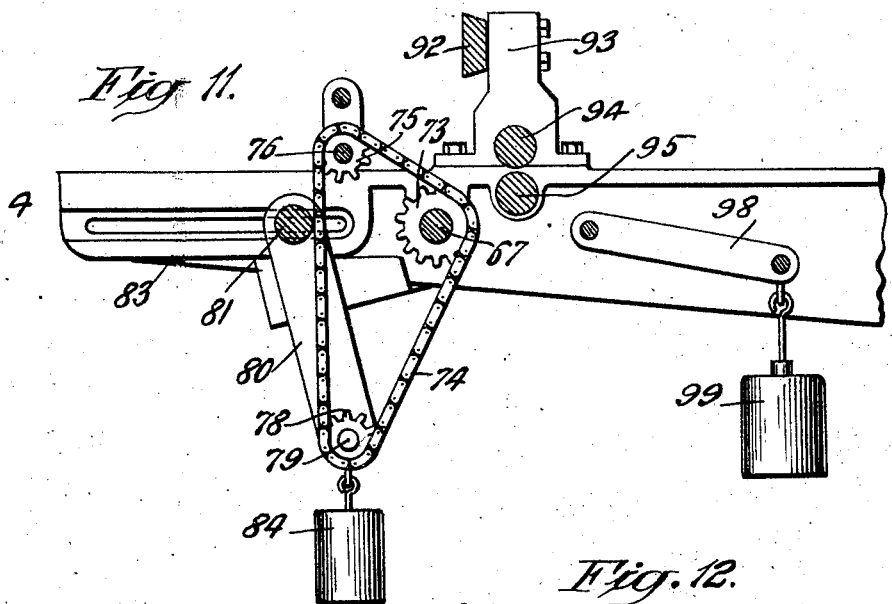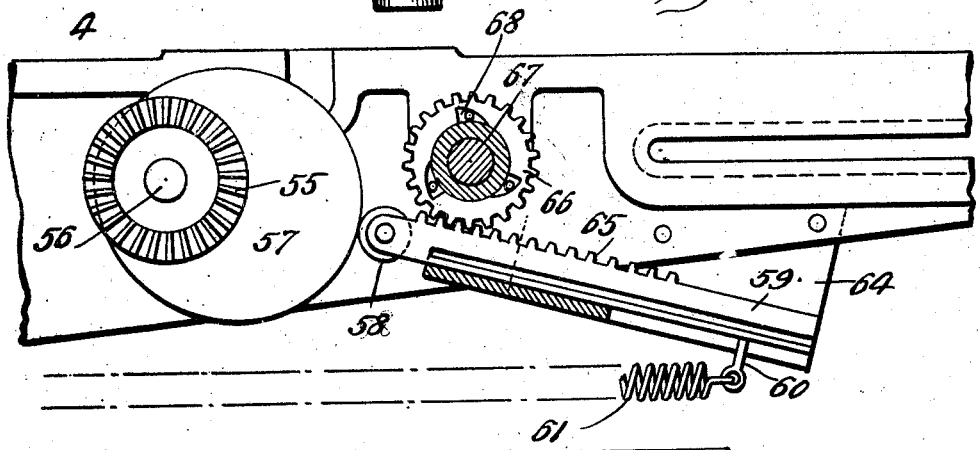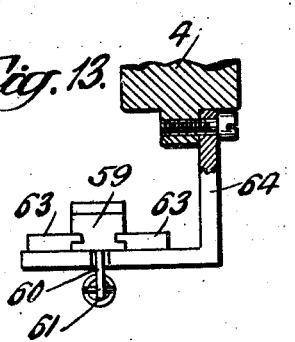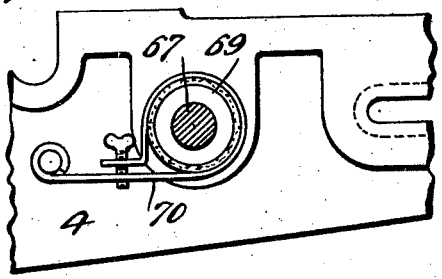

1,594,883

UNITED STATES PATENT OFFICE.

AUGUST W. HOLMBERG AND CENTRE W. HOLMBERG, OF NEW YORK, N. Y.

CARD-FEEDING MEANS.

Application filed January 24, 1923. Serial No. 614,573.

The object of our invention is to provide a card feeding device which will feed cards from the bottom of a stack for any purpose, as for a cutting machine, and a further object is to provide a means for stacking the cut cards after receiving the same.

These and other objects are accomplished by our invention, one embodiment of which is hereinafter more particularly set forth.

For a more detailed description of our invention, reference is to be had to the accompanying drawings, forming a part hereof, in which—

Figure 1 is a side elevation of a machine embodying our invention.

Figure 2 is a detail showing rotary cutters and strippers.

Figure 3 is a plan view of the structure shown in Figure 1.

Figure 4 is a longitudinal section of the machine.

Figure 5 shows the mechanism for driving the rotary cutters which is placed on the side opposite that shown in Figure 1.

Figure 6 is a front elevation of the receiving platform and its support.

Figure 7 is a diagrammatic view showing the wiring and switches for controlling the motors.

Figure 8 is an enlarged sectional view at the front of the machine, taken at the right of Figure 1.

Figure 9 is an enlarged view of a portion of the mechanism for shifting the receiving table.

Figure 10 is a sectional view taken on the line 10—10 of Figure 1, as indicated.

Figure 11 is a sectional view, taken on the line 11—11 of Figure 3, looking in the direction of the arrows.

Figure 12 is a similar section taken on the outside of the frame at the left of Figure 3, and looking towards the frame.

Figure 13 is a sectional view showing an end of a slide used in the mechanism shown in Figure 12.

Figure 14 shows a brake mechanism which is used on the feed roller and is a section taken on the line 14 of Figure 3, looking in the direction of the arrow.

Throughout the various views of the drawings, similar reference characters designate similar parts.

Our improved machine 1 has a frame 2 with legs 3, brackets 4 with braces 5 connecting the brackets and legs and also suitable brackets 6 and 7 for supporting the motors which drive the machine, the motor 8, which rests on the bracket 6, drives the feeding and cutting mechanism of the machine and the motor 9 which rests on the bracket 7 drives the card receiving platform 10 in a manner which will be described below.

The motor 8 has an armature shaft 11 which has a flexible coupling 12 which is connected to a shaft 13 which turns in suitable bearings 14 and carries a worm 15 that drives a worm gear 16, see Figures 3 and 5, which is fixed to a shaft 17 and also has fixed thereon a gear 18 which meshes with a gear 19 on a shaft 20. The gear 18 also meshes with spur gears 21 and 22 which are mounted on their respective stud shafts 23 and 24 and these gears 21 and 22 mesh with corresponding gears 25 and 26 on the shafts 27 and 28 and these gears 25 and 26 mesh with identical gears 29 and 30 on the shafts 31 and 32. All of the shafts 17, 20, 25, 27, 28, 31 and 32 are mounted in adjustable bearings and extend across the entire width of the frame 2.

The shafts 17 and 20 carry the rotary cutters 33 in the conventional manner and these cutters are placed on these shafts at any desired intervals, according to the sizes of cards to be cut. Between the sides, the shafts 27, 28, 31 and 32 are enlarged to form feed rollers and the shafts 27 and 31 carry the feeding tapes 34 and 35 which will be described below. The frame 2 also carries the crossings 36 and 37 on which are mounted adjustably a number of strippers 38 which are preferably made substantially as shown in Figure 4 with suitable perforations to fit the crossings, set screws 39 to hold them in place and flared L extensions 40 which are adapted to be brought close together so as to prevent the cards from following the cutters after being severed.

On the end remote from the gear 18, the shaft 17 carries two other gears 41 and 42, the former being a spur gear which lowers the receiving table 10 in a manner which will be described below, and the latter has a beveled gear which meshes with a corresponding beveled gear 43 on the main cam shaft 44 which is journaled in suitable bearings 45 and 46 which are mounted on the frame 2. Adjacent to the beveled gear 43, the shaft 44 carries a cam 47 which has an indentation 48 which will lower the cam roller 49 when entering therein, as is obvious. This cam roller 49 is carried on an arm 50 which extends from the transverse shaft 51 and the roller 49 is kept against the cam 47 by means of a coil spring 52 which surrounds one end of the shaft 51 and presses against the arm 50 at one end and is secured to the frame 2 at the other. The shaft 51 carries a number of fingers 53 which cooperate with the tapes 34 and 35 so that momentarily and once in each revolution of the cam 47, these fingers are lowered so as to release the edge of a card and cause the same to be perfectly alined before being released and fed to the cutters and they are raised promptly so as to release only one card at a time.

The front end of the shaft 44, that is the end remote from the gear 43, is provided with a beveled gear 54 which meshes with a beveled gear 55 on a shaft 56 which may be either a stud shaft secured in the frame 2 or on the shaft which extends across the machine. In any event, the gear 55 runs idly on the shaft 56 and is fixed to a cam 57 which engages a pintle 58 which is mounted in a rack slide 59 which has a downwardly extending eye 60 which is connected to a coil spring 61 which is also connected to a bracket 4 of the machine by means of a screw 62. This slide 59 moves in the direction of its length only between suitable guides 63 on the supporting bracket 64 which is also supported by the bracket 4 in any suitable manner. The function of the spring 61 is to force the roller 58 against the cam 57 so that the movements of the slide will at all times correspond to the operation of the cam. The cam is so shaped as to give the slide a back and forth motion with the desired timing. The slide 59 carries a rack 65 which meshes with a gear 66 which is mounted on a shaft 67 and connected thereto by means of a clutch 68, as a roller clutch so that the gear 66 can turn the shaft 67 in one direction only, that is when the bar 59 is positively driven by the cam 57 and not on the return movement under the influence of the spring 61. The shaft 67 is journaled in the table 4 and runs across the machine. At its far end it is provided with a friction wheel 69 which engages a suitable brake 70 which is also secured to the bracket 4 of the machine so that this shaft 67 will not turn too freely and thereby feed more than one card at a time. This shaft 67 also carries any desired number of rubber covered feed rollers 71 which feed the cards 72 in a manner which will be described below. The rollers 71 are the main card feeding rollers, but by themselves they are not sufficient to function properly. They must be assisted by auxiliary rollers mounted and driven in a manner which will now be described.

The shaft 67 carries a sprocket wheel 73 and over this wheel runs an endless sprocket chain 74 which meshes with two other sprocket wheels, one 75 on a shaft 76 which carries the auxiliary rollers 77 at a higher level than the rollers 71, and the other is the sprocket wheel 78 on a stud shaft 79 which extends from the weighted arm 80 which is pivoted on a shaft 81 which is mounted so as to slide forward or back when adjusted and which is held in proper position by means of a set screw 82, the bracket 4 being slotted at 83 for this purpose. It will be understood that the bar 81 is made adjustable so that cards of different sizes may be fed and cut in this machine. To hold the chain tight at all times and take up slack, the arm 20 is provided at its lower end with a weight 84.

The shaft 81 is preferably made so that it cannot turn and it carries uprights 85 which are adjustably mounted thereon and provided in any suitable number, four being shown in Figure 3 and these uprights carry adjustable bearings 86 in which the shaft 76 is journaled. Some of these uprights 85, have the end uprights carry guides 87 which hold the cards 72 in alignment. An auxiliary guide 88 may also be supplied to force these cards rearward, as shown in Figure 4.

The rear edges of the cards 72 engage the uprights 89 which are slidably mounted in suitable frames 90 and provided with adjustable screws 91 which are very carefully made and adapted to engage grooves in the slides 89 so that by turning the screws 91 it is possible to obtain a very fine adjustment between the lower edges of the guides 89 and the periphery of the rollers 71 which are immediately beneath the same. This adjustment must be within one-thousandth of an inch so that only one card 72 can pass from the stack when the apparatus functions in a manner which will be described below. Each bracket 90 is slidably mounted on a bar 92 supported from uprights 93 at each bracket 4 and, journaled in suitable bearings beneath the uprights 93, are the roller shafts 94 and 95 respectively which carry the bands 34 and 35, the bands 34 connecting the rollers 31 and 94 and the bands 35 connecting the rollers 27 and 95. The lower run of the bands 35 support an idler roller 96 mounted on a shaft 97 which is secured to the swinging arms 98 which in turn are mounted so as to swing on the shaft 56. To make the roller 96 more effective, the arms 98 are provided with weights 99 which give the desired tension.

When the cards pass from the stack to the fingers 53 by means of the bands 34 and 35, they are alined and then immediately released and passed through the cutters 33 and are then caught by the rollers 32 and 28 and deposited on the table 10 or on other cards already on the table 10. If the table 10 were too low these cards would not stack, but would fall irregularly. From this, it is obvious that if the cards are to be properly stacked, the table 10 must be lowered to correspond to the cards cut. Mechanism for lowering the table so as to keep this right relation will now be described.

The gear 41 meshes with a corresponding gear 100 which turns on a stud shaft 101 and this gear 100 carries an adjustably mounted crank pin 102 which is pivotally connected to a link 103 which at its upper end is pivotally connected to a second link 104 (see Figure 9) which is pivoted on a stud shaft 105 which also carries a ratchet wheel 106 which is adapted to be driven by a spring pressed pawl 107 in the conventional manner. This pawl 107 may be raised or lowered manually by means of a handle 108 which, in the mechanism shown, is thrown to the left, in Figure 9, and thereby causes a contact 109 to be lowered on another contact 110 and thereby complete an electric circuit, in a manner which will be described below. The stud shaft 105, like the stud shaft 101 is mounted from the frame 2 of the machine and the pawl mechanism is carried entirely by the link 104.

The ratchet gear 106 is fixed to a helical gear 111 which meshes with the corresponding helical gear 112 at the upper end of a screw 113 and this screw carries a nut 114 which supports one end of the table 10. The other end of the table 10 is supported by a corresponding nut 115 on a screw shaft 116 which is parallel to the shaft 113 at all times. The shafts 113 and 116 are mounted at their upper ends in suitable bearings 117 and at their lower ends in bearings 118 so that at all times these shafts will remain in proper relation. At their lower ends, these shafts are provided with beveled gears 119 which mesh with corresponding beveled gears 120 on a connecting shaft 121 which is also journaled in different parts of the bearings 118. The throw of the pawl 107 is determined by the position of the adjustable crank pin 102 and the position of this crank pin is determined by the thickness of cardboard to be cut and stacked, all the parts being calculated and adjusted so that as the gear 100 revolves, the table 10 will be lowered the thickness of a card so that each card will ride either on the table or on another card supported by the table at the proper level so as to be stacked. When the table 10 reaches the lower limit of its movement, it is obvious that the machine should be stopped until an attendant can remove the cards and restore the table to its initial position. To accomplish this, the nut 115 is provided with a downwardly extending adjustable stud 122 which is adapted to engage its switch 123 at the lower limit of its movement and when it engages this switch, the main circuit through the motor 8 is opened, as appears from Figure 7, which is the wiring diagram. In this view, it appears that electricity is supplied by means of the usual conductors or lead in wires 124 and 125. The attendant can then go to the machine and remove the cards and press a foot pedal 126 (see Figure 6) and thereby pull the link 127 which is connected thereto and shift a bell crank lever 128 so as to shift a clutch 129 and thereby fix a worm gear 130 on the shaft 21 which worm gear is connected to a worm 131 on the armature shaft 132 of the motor 9. The foot pedal 126 may be pivoted in any suitable manner, as to a projection 133 which extends downwardly from the motor supporting bracket 7. After this is done and while the foot pedal 126 is depressed, the operator must close a switch 134 and the switch between the contacts 109 and 110 and then the motor 9 will drive the shaft 121 so as to elevate the nuts 114 and 115 and this elevation will continue until a projection 135 which rises upwardly from the nut 114, engages the switch 136 and opens the same and thereby opens the circuit through the motor 9. The switch 134 is then opened and when the machine is started the lever 108 is thrown so as to open the circuit between the parts 109 and 110 and thereby permit the machine to function.

Operation.

In view of the foregoing, the operation of our improved machine will be readily understood. Assuming a stack of cards to be in place, as shown in Figure 1, and the table 10 at the proper level, the machine is started by closing a switch, as the switch 123, and then the knives begin to rotate and the bands 34 and 35 to move and the alining fingers 53 to rise and fall and the rollers 71 and 77 rotate always in the same direction, but intermittently and according to the shape of the cam 57, that is about fifty per cent of the time. As these rollers rotate, both the front and rear of the bottom card are urged backward to the tapes 34 and 35 and this urging is sufficient to move the bottom card. Only the bottom card can move because the card immediately above it is held by the guides 89. As soon as the card above it is held by the guides 89 it is caught by the bands 34 and 35 and carried forward with a continuous pressure and as soon as it reaches the alining fingers 53, it is momentarily stopped and alined by the continuous movement of the bands 34 and 35 while it is so stopped and then it is released and it runs true to the cutters and thereafter it is released by the strippers and the rollers 32 and 28 and deposited on the table 10 or on other cards already deposited and this continues until the table 10 reaches the lower limit of its movement at which time the projection 122 opens the switch 123. After the operator has removed the cards from the table 10, he restarts the apparatus by pressing on the foot pedal 126, and otherwise proceeding as above described. From time to time the operator will renew the cards 72 in the stack.

While we have shown and described one embodiment of our invention, it is obvious that it is not restricted thereto, but that it is broad enough to cover all structures that come within the scope of the annexed claim.

Having thus described our invention, what we claim is:

In a machine of the class described, driven rollers for supporting the front and rear ends of an inclined bottom card so that all the other cards in a stack are supported by the bottom card, a laterally and vertically adjustable front gate having a forwardly inclined lower end supported the thickness of a blank above the forward roller, the rear roller being supported for vertical and horizontal adjustment and an auxiliary inclined wall positioned above and slightly to the rear of the highest portion of the rear supporting roller.

In testimony whereof we have hereunto set our hands and seals this 19th day of January, 1923.

AUGUST W. HOLMBERG.
CENTRE W. HOLMBERG.